United States Patent

Correll

[15] 3,697,823

[45] Oct. 10, 1972

[54] METAL-TO-GLASS-TO-METAL HERMETIC SEAL

[72] Inventor: Edward Max Correll, Columbia, S.C.

[73] Assignee: General Electric Company

[22] Filed: Nov. 3, 1971

[21] Appl. No.: 195,295

Related U.S. Application Data

[63] Continuation-in-part of Ser. No. 889,004, Dec. 29, 1969, Pat. No. 3,624,460.

[52] U.S. Cl. ................. 317/230, 174/50.61, 174/52
[51] Int. Cl. ............................................. H01g 9/10
[58] Field of Search ...317/230, 231, 233; 174/50.61, 174/52

[56] References Cited

UNITED STATES PATENTS

| | | |
|---|---|---|
| 3,275,359 | 9/1966 | Graff................... 174/50.61 X |
| 3,275,901 | 9/1966 | Merritt et al. ............. 317/230 |
| 3,307,086 | 2/1967 | Propps..................... 317/230 |
| 3,337,679 | 8/1967 | Puppalo et al............... 174/52 |
| 3,370,874 | 2/1968 | Scherer et al......... 11/50.61 X |
| 3,522,489 | 8/1970 | Sparrow et al............. 317/230 |
| 3,624,460 | 11/1971 | Carrell...................... 317/230 |

Primary Examiner—James D. Kallam
Attorney—Nathan J. Cornfeld et al.

[57] ABSTRACT

A hermetic metal-to-glass-to-metal seal for a sealed casing is disclosed comprising an outer metal member and an inner metal member, one of which is a film-forming metal. The inner member extends through an acid-resistant glass member which is sealed to both metal members.

7 Claims, 4 Drawing Figures

PATENTED OCT 10 1972

3,697,823

INVENTOR:
EDWARD MAX CORRELL,
BY John P. Taylor
HIS ATTORNEY.

METAL-TO-GLASS-TO-METAL HERMETIC SEAL

CROSS-REFERENCE TO RELATED APPLICATION

This application is a continuation-in-part of U.S. application, Ser. No. 889,004 filed Dec. 29, 1969 now U.S. Pat. No. 3,624,460. Glass compositions suitable for use in the seal assembly of the present invention are disclosed in co-pending application, Ser. No. 888,371, filed on Dec. 29, 1969 in the name of William A. Graff and Jaroslaw Kohut, entitled: "SEAL GLASSES," assigned to the assignee of the present invention.

FIELD OF THE INVENTION

This invention relates to seal assemblies and more particularly to metal-to-glass-to-metal fused hermetic seals useful in the manufacture of electrical devices such as electrolytic capacitors having sealed assemblies for containing corrosive electrolytes therein.

Prior art electrolytic capacitors containing a porous sintered anode and a wet type electrolyte heretofore have often employed as an end seal a fluorocarbon or elastomer element and metal case crimped together. Others have utilized one or more O-rings placed under internal pressure. However, heretofore none of the prior art capacitors have been able to achieve a hermetic seal in which all components of the seal assembly which contact the electrolyte are resistant to its corrosive attack when the electrolyte contains concentrated sulfuric acid, and which components can expand and contract together so as to maintain the hermetic seal fluid-tight through broad ranges of temperature and severe thermal shock.

SUMMARY OF THE INVENTION

It is therefore a principal object of the invention to provide an improved hermetic metal-to-glass-to-metal seal assembly suitable for use in electrolytic capacitors without leakage over a relatively broad temperature range and which is capable of withstanding severe thermal shock.

Another object of the invention is to provide an effective hermetic metal-to-glass-to-metal seal assembly for electrolytic capacitors of the sintered tantalum pellet type having a sulfuric acid electrolyte.

Further objects and advantages of the invention will become apparent from the following detailed description thereof.

To accomplish the foregoing and other objects of the invention a three-part metal-to-glass-to-metal hermetic closure is provided which includes an outer and an inner metal part each having directly sealed thereto a glass body having a particular composition of predetermined properties, the glass containing an effective amount of chromic oxide. At the interfaces between the glass and the metal parts, because of the glass composition, no reaction products are present which could be susceptible to attack by the acid electrolyte. The glass has a mean thermal coefficient of expansion which is not greater than that of the metal parts of the seal and which preferably does not differ therefrom by more than about $15 \times 10^{-7}$ cm/cm° C over the temperature range of 0° to 300° C, thus resulting in a substantially matched or slight compression type seal.

BRIEF DESCRIPTION OF THE DRAWING

In the drawing accompanying and forming part of this specification.

DESCRIPTION OF THE PREFERRED EMBODIMENTS

Figure 1:
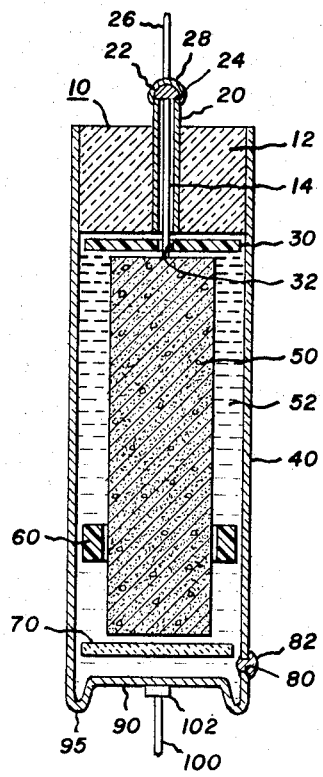
FIG. 1 is a sectional view of an electrolytic capacitor having a hermetic seal according to the invention.

FIG. 1 shows, in cross-section, an exemplary construction of a device using the present invention. The illustrated capacitor comprises a hermetic seal end closure 10, containing a glass body 12 which is fusion-bonded to a tantalum eyelet tube 20, illustrated as located along the central axis of the capacitor, and also fusion-bonded to an outer casing 40 of tantalum located around the periphery of the glass body 12. Within the casing 40 there is disposed a porous tantalum sintered-pellet anode 50, immersed in an electrolyte 52 containing a 35 to 45 percent aqueous solution of sulfuric acid. A fluorocarbon (Teflon) spacer ring 60 serves to space the anode 50 from the walls of the casing 40 and to hold the porous anode 50 in axial position. A fluorocarbon insulative spacer disc 30 spaces the anode 50 longitudinally from the end closure seal 10. A tantalum lead wire 14 extending from the anode 50 passes through a tight-fitting opening 32 in the insulative disc 30 and into the metal eyelet tube 20, where the tantalum wire 14 is fixed at the end 24 of the tube 20 by a tantalum weld 22. This weld 22 serves to seal off the end 24 of the eyelet tube 20 and provides an electrical connection from the tantalum lead 20 to a solderable lead wire 26 of copper or nickel, which is fixed by a butt weld 28 to the tantalum weld 22.

In the device illustrated in FIG. 1, the casing 40 is of all-welded tantalum construction and is closed at its lower end by means of a tantalum bottom cover member 90, welded at 95 by a tantalum weld around its periphery to the cylindrical portion of casing 40. Since tantalum metal has the extremely high melting point of 3,000° C, a protective heat shield 70 is positioned between the anode 50 and the bottom cover member 90 to prevent heat damage to the anode during the welding operation which joins the cover 90 to the casing 40. The heat shield 70 remains within the casing 40 and therefore must be thin but refractory enough to protect the transmission of heat therethrough during the peripheral welding operation, but it must also be resistant to the sulfuric acid electrolyte 52 in which it remains immersed. I have found that one satisfactory material which has these desired properties is a compressed fibrous sheet ceramic material of alumina-silica composition, obtainable from the Carborundum Company, and designated as No. 970 AH "paper."

An opening 80 is positioned in the wall of the casing 50 through which the liquid electrolyte can be introduced, after a vacuum is first applied to the assembled sealed casing. Ambient air pressure causes the acid electrolyte to flow into the vacuum in the casing 40. The opening 80 is sealed closed by means of a tantalum ball-weld, performed for example by resistance welding. The peripheral weld at 95, however, is preferably performed by tungsten inert-gas welding, or by use of an electron beam to concentrate the heat of the weld and to inhibit the heat from spreading beyond the weld joint to the anode 50 or glass body 12. A solderable cathode lead 100 of copper or nickel is welded at its formed head 102 to the bottom tantalum cover member 90 of the casing.

The all-welded tantalum case construction of the capacitor illustrated in FIG. 1 makes possible a reverse voltage capability of at least −1 volts DC at 85° C operating temperature.

The metal-to-glass-to-metal seal of the invention can also be embodied in other sealed structures. Of the known film-forming metals, when the capacitor contains a sulfuric acid electrolyte, tantalum is preferred to form the metal portion of the glass-to-metal seal, because of its resistance to sulfuric acid, its ability to be formed and drawn with ease, and because of its ability to form tantalum pentoxide as a uni-directional dielectric barrier, which makes possible the above-mentioned reverse voltage characteristics.

It should be understood that the glass-metal seal structure described herein could be employed in types of capacitors other than those shown. For example, the casing 40 could be in cylindrical, deep-drawn or cup-shaped form, with an anode of suitable type (such as wound foil or sintered pellet anode) inserted therein, the casing serving as the cathode and having a cathode terminal lead secured thereto.

Figure 2:
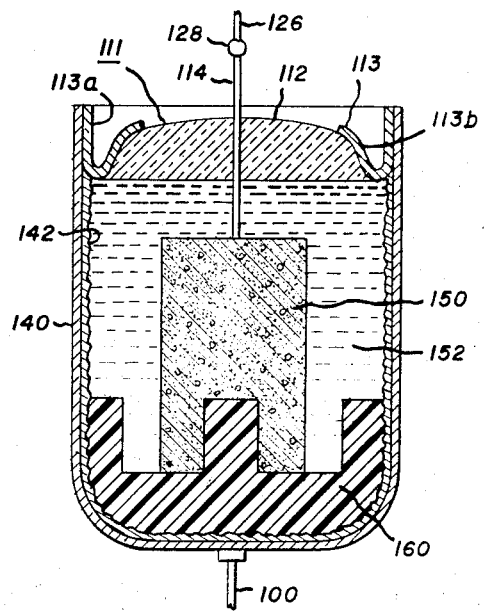
FIG. 2 is a sectional view of another capacitor structure embodying a glass-to-metal seal according to the invention.

In the embodiment illustrated in FIG. 2, there is shown another exemplary construction of a capacitor having a cup-shaped casing without the bottom peripheral weld of FIG. 1. In FIG. 2 the glass body 112 of the seal assembly 111 is surrounded by a metallic header ring 113, and a tantalum lead wire 114 passes through the glass body 112 to the porous sintered anode pellet 150, contained within the cup-shaped casing 140. A cathode terminal lead 100 is secured to the bottom of the casing. The casing 140, depending upon the composition of the electrolyte, may be of any well-known casing cathode metal and may include tantalum, stainless steel, silver, silver alloys, nickel, titanium, aluminum, zinc, copper and the like. The inner surface of the casing 140 may also have an adherent conducting layer 142, to resist attack by the electrolyte or to enhance the cathode area, as more fully described in application, Ser. No. 736,064 of Joel B. Buice, now issued as U.S. Pat. No. 3,531,693. The porous sintered anode 150 can be any of the well-known valve metals such as aluminum, zirconium, niobium, tantalum, etc., selected in accordance with the particular application for which it is desired, the electrolyte which is used and commercial cost considerations. The anode 150 has an oxide dielectric film (not shown) formed over all surfaces thereof, as is well known in the art. The anode 150 is immersed in a liquid or gel electrolyte 152 contained in the casing 140. The electrolyte may be of any conventional or known type of capacitor electrolyte, provided that it is not corrosive to the seal components or casing surface with which it comes in contact and will be suitable for the particular capacitor application.

Header ring 113 preferably comprises tantalum. However, other metals may be used. Preferably, the metal should be resistive to acid attack, at least in the area exposed to the electrolyte. Ring 113 must comprise a metal capable of being bonded to metal casing 140. Furthermore, ring 113 must have a thermal coefficient of expansion at least as great as, and preferably greater than the glass to insure a proper bond thereto. Examples of materials which can be used for ring 113 include tantalum, nickel-iron alloys, and steel.

When non-acid resistant metals are used for ring 113 they may be clad or plated, in the area of electrolyte contact, with acid resistant metals such as gold, silver or the like.

The cup-shaped casing 140 has a single open end which is hermetically sealed by the glass-to-metal seal 111 of the invention. Within casing 140 there is positioned a bottom spacer 160 made of a chemically resistant insulating material having low vapor transmission and moisture absorbent characteristics, such as polytetrafluoroethylene (Teflon). Passing through the end closure 111 and extending outwardly of casing 140 is terminal lead wire 114, typically composed of tantalum, or other equivalent film-forming or valve metal having similar thermal expansion properties, and having an anodic dielectric oxide film formed thereon, the lead wire 114 being secured at its inner end to anode 150. At its outer end, terminal lead 114 is welded at 128 or otherwise joined to an external lead 126, usually composed of a solderable metal such as nickel, copper or the like. The glass-to-metal seal structure 111 which closes casing 140 at its open end provides a strong, hermetic seal, which is compatible with the electrolyte 152 and effectively prevents its escape from within casing 140 even under severe operating conditions of widely varying temperature and pressure.

Figure 4:
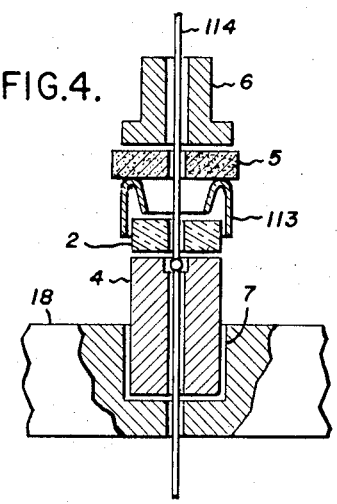
FIG. 4 is a sectional view of parts assembled in a fixture, illustrating another method of making a glass-to-metal seal, for the device of FIG. 2.

The seal structure 111 comprises a metal retaining ring 113 having, in the embodiment illustrated in FIG. 2, a rim portion 113a adapted to be secured to the adjacent wall portion of casing 140 by welding, soldering or other suitable means, and a tapered conical seal surface 113b in which the glass body 112 is received and which has an axial lead wire 114 passing therethrough, as shown, glass body 112 being fusion-sealed to ring 113 and lead wire 114, for example by the process described below in connection with FIG. 4. Where both the casing 140 and the retaining ring 113 are formed of the same metal, galvanic corrosion is avoided and metallurgical bonding is improved. It should be understood, however, that any joint between the casing 140 and the seal 111 which is appropriate, considering the proposed capacitor use and environment, may be used in conjunction with the present invention.

In the structure of FIG. 2, the glass body 112 is fusion-sealed to both ring 113 and lead wire 114. Preferably, the metal seal surface portion 113b of ring 113 tapers outwardly so as to help ensure retention of the glass seal material 112 in position in the event of pressure build-up within the casing 140, in which event the tightness of the seal will be even further enhanced due to pressure forcing the parts more intimately together. Retaining ring 113, with the glass body 112 formed therein and terminal lead 114 embedded in the latter, is joined at its rim portion 113a to the adjacent wall portion of casing 140 by welding or soldering, or other suitable means which will ensure a strong fluid-tight joint.

In accordance with the invention, the glass material and the metal parts of the glass-to-metal seal preferably have a substantially matched to slight compression relationship, the coefficient of thermal expansion of the glass body 12, 112 being not greater than that of the metal parts. Thus, the glass material of the body 12 or 112 and the respective metal parts 40 or 113, and 20 or 114 of the same corresponding seal structure will tend to expand and contract together without cracking so as to remain fluid-tight through broad ranges of temperature and termal shock. Since the glass has a coefficient of thermal expansion very close to and less than that of tantalum, it avoids the problems of differential expansion and contraction which, in the past, have made difficulties in prior types of glass-to-metal seals for such capacitors. In addition, the glass material employed in accordance with the invention provides additional benefits by virtue of its superior resistance to chemical attack by aqueous sulfuric acid electrolyte in the concentration of 35 percent to 45 percent sulfuric acid, as commonly used in tantalum electrolytic capacitors.

The glass composition, set forth in detail below, has the ability of forming an intimate bond with the metal parts of the hermetic seal. The glass is applied as an annular glass preform and melted, and as the glass cools from the molten state during the fusion operation it seals to the metal or to a pre-formed oxide film which may form thereon.

Glasses for the present invention preferably have compositions approximately in the following ranges in percent by weight:

| | |
|---|---|
| $SiO_2$ | 63–65% |
| $Al_2O_3$ | 2–3% |
| $Na_2O$ | 2–3% |
| $K_2O$ | 6–8% |
| CaO | 0–2% |
| BaO | 4–6% |
| $Cr_2O_3$ | 0.2–1.0% |
| $B_2O_3$ | 15–17% |

A coloring material, such as about 0.5 percent cobalt oxide may also be added, if desired.

Glasses of the invention have coefficients of thermal expansion preferably in the range of about 51 to 57 × $10^{-7}$ cm/cm/° C in the temperature range of 0° to 300° C.

The following are specific examples of compositions of the above glass which have proved satisfactory.

EXAMPLE I

The glass was produced from a batch having the composition in parts by weight of:

| | | |
|---|---|---|
| Silica sand | 3153 | Parts by Weight |
| Aluminum oxide | 151 | |
| Sodium carbonate | 172 | |
| Potassium carbonate | 593 | |
| Boric oxide | 863 | |
| Barium carbonate | 257 | |
| Calcium carbonate | 180 | |
| Chromic oxide | 50 | |

When these proportions are measured in grams, this batch after mixing can be melted in a platinum-rhodium crucible in an air atmosphere electric furnace at a temperature between 1,482° and 1,510° C to produce about 5,000 grams of glass. The theoretical composition of glass, as calculated from the batch in weight percent, is 63% $SiO_2$, 3% $Al_2O_3$, 2% $Na_2O$, 8% $K_2O$, 17% $B_2O_3$, 4% BaO, 2% CaO, and 1% $Cr_2O_3$.

The glass has the following approximate physical properties:

| | |
|---|---|
| Softening point | 776°C ± 15°C |
| Annealing point | 585°C ± 15°C |
| Strain point | 548°C ± 15°C |
| Coefficient of Expansion (0–300°C) | $56.3 \times 10^{-7} \pm 2.0 \times 10^{-7}$ |
| Sealing temperature | Below 1000°C |
| Color | Dark green |

The glass forms a satisfactory hermetic fused seal with tantalum, which has an expansion coefficient of about $66 \times 10^{-7}$ cm/cm/° C. The coefficient of expansion of the glass should be somewhat lower than that of tantalum in order to provide a slight compression type seal.

Various examples of glasses of the invention found to make suitable seals to tantalum and other metals are listed in Table I below along with their coefficients of expansion.

TABLE I

Composition: Per Cent by Weight

| Oxide | 1 | 2 | 3 | 4 |
|---|---|---|---|---|
| $SiO_2$ | 63.0% | 62.6% | 64.0% | 65.0% |
| $Al_2O_3$ | 3.0 | 3.0 | 3.0 | 3.0 |
| $Na_2O$ | 2.0 | 2.0 | 2.0 | 2.0 |
| $K_2O$ | 8.0 | 8.0 | 7.0 | 6.0 |
| CaO | 2.0 | 2.0 | 2.0 | 2.0 |
| BaO | 4.0 | 4.0 | 4.0 | 4.0 |
| $Cr_2O_3$ | 1.0 | 1.0 | 1.0 | 1.0 |
| $B_2O_3$ | 17.0 | 16.9 | 17.0 | 17.0 |
| CoO | — | 0.5 | — | — |
| Coef. of Exp. ($\times 10^{-7}$) | 56.3 | 58.7 | 55.1 | 51.7 |

The above listed coefficients of thermal expansion of the glass material compositions of Table I are all less than, but approximate closely that of tantalum, which is about $66 \times 10^{-7}$ cm/cm/° C.

Figure 3:
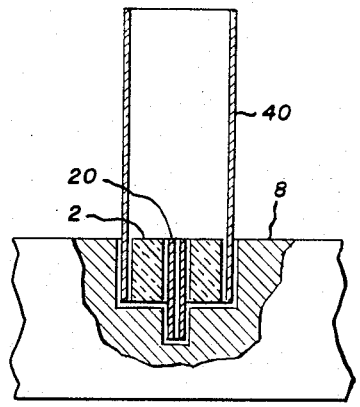
FIG. 3 is a sectional view showing parts assembled in a fixture for making of the glass-to-metal seal of the device of FIG. 1.

FIG. 3 illustrates a preferred method of making a hermetic metal-to-glass seal of the type illustrated in the capacitor shown in FIG. 1 of the drawing. To form a glass-to-metal seal useful in a tantalum capacitor, for example, the glass may be crushed to a powder, mixed with a binder, pressed to form an annular glass preform pellet, then heated first to completely volatilize the binder and then further heated to sinter the glass particles of the pellet together. As illustrated in FIG. 3, a tantalum eyelet tube 20, an annular glass preform 2 having a glass composition such as shown in Table I, and a tantalum tube 40, which will form part of the capacitor case, are positioned as shown in concentric receiving recesses formed in the fixture 8, which is made of a getter metal, such as titanium. The fixture is provided to support the outer and inner film-forming metallic parts as well as the glass body during the fusion bonding of the glass to the metal parts. The purpose of this fixture being of getter metal is a key feature of the method of the invention, because it serves to keep the tantalum parts 20, 40 of the seal pure and uncontaminated, since the getter metal of the fixture draws impurities away during the seal forming process and prevents contamination of the tantalum metal, so that an oxide dielectric layer can successfully be formed subsequently, by usual electrochemical anodizing on the metal parts of the hermetic glass-to-metal seal.

FIG. 4 of the drawing illustrates a method of making a glass-to-metal seal having a header ring of the type illustrated in the capacitor of FIG. 2. As shown in FIG. 4, a metal header ring 113 which may, for example, comprise tantalum, nickel-iron, or steel, a tantalum current leading-in wire 114, and annular pressed glass preform 2 having a composition as shown in Table I, are positioned in a retaining fixture 18 with the tantalum wire extending through the center of the preform and the preform supported concentrically in the metal header 113. The glass preform 2 may be covered by a graphite cap 5. A getter body 6 of tantalum, or preferably titanium, is positioned around the wire 114 and close to the header ring 113. The header, and to a certain extent, the graphite pedestal 4 on which the parts rest, as well as the graphite cap 5, are all supported within a recess 7 of the steel retaining fixture 18. A vacuum is applied to exhaust the air, the entire assembly is heated in a furnace, first to a temperature of 650° for about 20 minutes for degassing, and then in an atmosphere of argon to a temperature of about 1,000° C for about 30 to 45 minutes to fusion-bond the glass to the metal members. The glass-to-metal seal assembly is then cooled to room temperature in the argon gas atmosphere. The metal header ring 113 is then circumferentially metallurgically bonded to the metal container 140 of the capacitor to hermetically seal the latter.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim and desire to secure by Letters Patent of the United States is:

1. A hermetic metal-to-glass-to-metal seal for a sealed casing comprising outer and inner metal means, at least one of said metal means being of film-forming metal, an annular glass member sealed to said inner and to said outer metal means, said inner metal means extending through said glass and said glass member having the approximate composition of from 63 to 65% $SiO_2$, 2 to 3% $Al_2O_3$, 2 to 3% $Na_2O$, 6 to 8% $K_2O$, 0 to 2% CaO, 4 to 6% BaO, 0.2 to 1.0% $Cr_2O_3$, and 15 to 17% $B_2O_3$.

2. The seal of claim 1 wherein said film-forming metal comprises tantalum.

3. The seal of claim 1 wherein said inner metal means comprises tantalum.

4. The seal of claim 3 wherein said tantalum metal means comprises a tube.

5. A hermetic metal-to-glass-to-metal seal for a sealed casing comprising a central metal member, an annular glass member sealed to said central member and an outer metal member sealed to said glass member and bondable to a casing, said central metal member extending through said glass member and said seal comprising an acid-resistant glass having the following approximate composition:

| | |
|---|---|
| 63 – 65% | $SiO_2$ |
| 2 – 3% | $Al_2O_3$ |
| 2 – 3% | $Na_2O$ |
| 6 – 8% | $K_2O$ |
| 0 – 2% | CaO |
| 4 – 6% | BaO |
| 0.2 – 1.0% | $Cr_2O_3$ |
| 15 – 17% | $B_2O_3$ |

6. The seal of claim 5 wherein at least one of said metal members comprises a film-forming metal.

7. The seal of claim 6 wherein said central metal member comprises tantalum.

* * * * *